Dec. 22, 1942.                M. W. CREW                2,306,038
                             PRESSURE GAUGE
                          Filed March 18, 1941

INVENTOR
MORRIS W. CREW
BY
Hyde and Meyer
ATTORNEYS

Patented Dec. 22, 1942

2,306,038

UNITED STATES PATENT OFFICE 2,306,038

PRESSURE GAUGE

Morris W. Crew, Shaker Heights, Ohio, assignor to The Hotstream Heater Company, Cleveland, Ohio, a corporation of Ohio Application March 18, 1941, Serial No. 383,965

1 Claim. (Cl. 73—110)

This invention relates to improvements in gauges and more particularly to that type of gauge utilized for measuring draft or pressure.

An object of the present invention is to provide a gauge which is particularly accurate over its entire range but which at the same time is constructed of a comparatively small number of parts easily manufactured and assembled and therefore capable of being sold for a very low price.

Another object of the present invention is to provide a gauge of the type desired wherein the parts may be readily assembled on a common frame and the parts may be very readily adjusted to take care of inaccuracies of manufacture either before or after the assembly is inserted in a case or housing.

Other objects and advantages of the present invention include the novel arrangement of a gauge of this type which is entirely independent of springs and other advantageous features which will be apparent from the accompanying drawing and specification.

Figure 1:
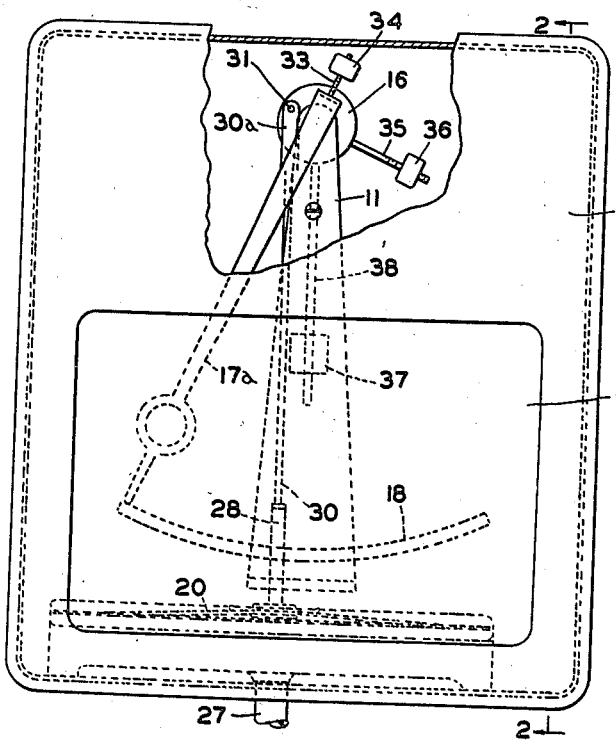
Figure 2:
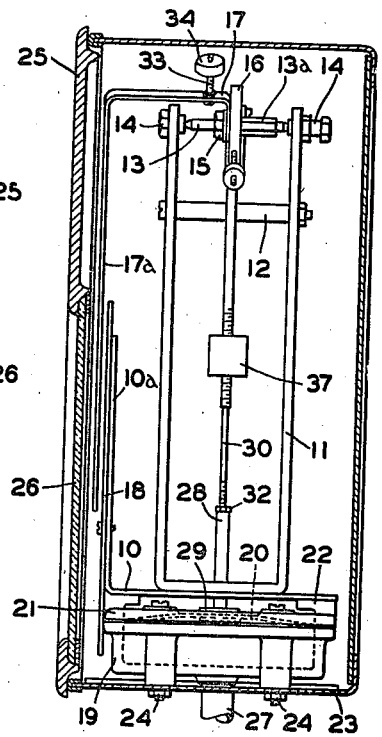
Figure 3:
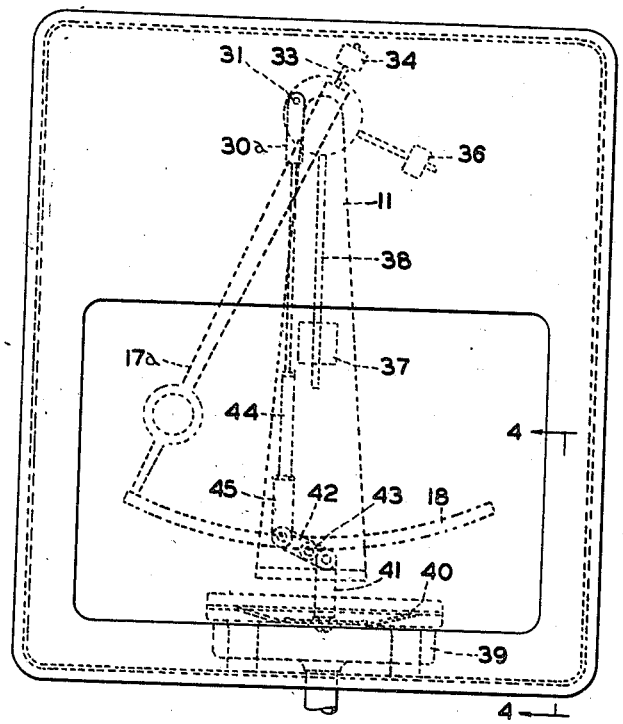
Figure 4:
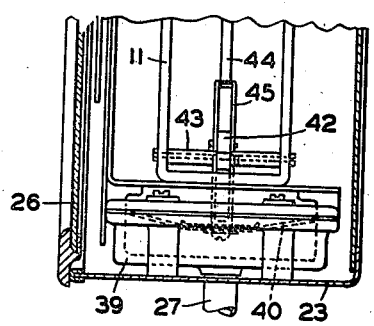

In the drawing, Fig. 1 is a front view of an instrument embodying my invention with a part of the casing broken away to more clearly show the parts; Fig. 2 is a sectional view taken along the line 2—2 of Fig. 1; Fig. 3 is a view similar to Fig. 1 showing a modified form of the instrument; while Fig. 4 is a fragmental sectional view taken along the line 4—4 of Fig. 3.

In the device of Figs. 1 and 2, upon a base 10 is welded or bolted a frame 11 consisting of a pair of substantially parallel frame members extending vertically upward from the base 10. Preferably a spacer bar 12 is secured between the parallel frame members to hold them rigidly in position with the proper spacing. Between the upper ends of the frame members a shaft 13 is oscillatably mounted as for instance by means of cone cup screws 14. Rigidly clamped to the shaft between the hexagonal portion 13a and a nut 15 is a disk 16 and the end of pointer 17. Preferably the pointer 17 extends radially outwardly from shaft 13, then in a horizontal direction to the front of the casing, and then downwardly as at 17a where the free end of the pointer travels over a calibrated scale 18. This scale is preferably mounted on an extension 10a of the base 10.

Beneath the base 10 is mounted a suction or pressure chamber which is composed of a stamping or casting 19 having an open top wall which is covered by the flexible diaphragm 20. It will be understood that the edges of this diaphragm are sealed in an air-tight manner by the top flange member 21. The diaphragm casing may be rigidly secured to the base 10 by means of the bosses or projections 22 so that all of the working parts of the unit may be assembled on a bench and then inserted in the casing 23 where the parts are held in position by the bolts 24. After this the front 25 is secured to the casing. The front has a glass window 26 through which the position of the pointer on the scale may be read. A pipe connection is provided at 27 for attaching the device to the apparatus in which the draft or pressure is to be measured. For instance the pipe 27 might lead to the breeching of a boiler.

An operative connection is provided between the diaphragm 20 and the pointer 17. This connection comprises a member 28 secured to the diaphragm at 29 and carrying an internal thread at its upper end into which the link 30 is screwed. This link carries at its upper end a clevis 30a which is pivotally connected at 31 to the disk 16 at a point removed from the center so that the disk provides a crank arm by means of which the movement of the diaphragm causes the shaft 13 to oscillate. In assembling the equipment the threaded connection between the member 28 and the link 30 permits adjustment between the parts, which adjustment is maintained by means of the nut 32. Obviously with the parts in the position of Fig. 1, when suction is applied to the chamber beneath the diaphragm the pointer 17a will move toward the right across the scale 18.

Means is provided for counterbalancing the pointer 17 and particularly that portion thereof, 17a, which extends radially downward from the shaft 13. To this end an arm 33 extends radially outwardly from the horizontal portion of pointer 17 in a direction diametrically opposite the pointer portion 17a and on the other side of shaft 13. A small counterweight 34 is threaded on this arm and may be adjusted to exactly balance the pointer portion 17a.

The same or additional means may be utilized to counterbalance the weight of diaphragm 20 and the link connection 28, 30.

The means here provided comprises an arm 35 extending radially outward from disk 16 and carrying the adjustable counterweight 36. When the instrument is first assembled the counterweights 34 and 36 may be so adjusted that the pointer will stand practically in any position in which it is placed.

To the above described instrument which is practically in balance I apply a pendulum weight 37 which is moved by changes in pressure or suction in the diaphragm chamber. This pendulum weight is mounted on an arm 38 which is threaded radially into the disk 16 in position so that the arm 38 hangs substantially vertically when the pointer 17a is at zero on the scale 18. The weight 37 is adjustable on the arm 38 so as to properly calibrate the instrument.

A modification of the above described instrument makes it suitable for reading positive pressures above atmosphere. This modification is shown in Figs. 3 and 4. The parts are all similar to those previously described except that a small pressure chamber is provided at 39 in all respects analogous to the suction chamber 19. The upper wall of this chamber is formed of the flexible diaphragm member 40 which is connected by a short link 41 with a lever 42. This lever has a pivot 43 fixed in the frame 11. The link 44 is entirely analogous to the link 30 previously described except that it has a clevis connection at 45 with one end of the lever 42. Obviously the movement of the diaphragm 40 will be transmitted to the pointer 17a as in the previously described form adapted for draft only. Here as before the weight 37 hangs in a substantially vertical position when the pointer is at zero on the scale and all parts are provided with counterbalances as previously described.

As previously mentioned, in either form of the device here disclosed the parts may be assembled on the bench and the counterweights properly adjusted, after which the device is easily assembled in the casing.

What I claim is:

A gauge comprising in combination as a unitary structure, a base, means providing a pressure chamber adjacent said base, said pressure chamber having a flexible diaphragm wall, a frame extending upwardly from said base, a horizontal shaft oscillatably mounted in said frame above said base, a pointer rigid with said shaft and extending radially therefrom for movement over a scale, a counterweight arm rigid with said shaft and radially counterbalancing said pointer, a crank arm on said shaft, link means directly connecting said arm and said diaphragm wall, a counterweight arm rigid with said shaft and counterbalancing said link means and diaphragm wall, an arm rigid with and extending radially from said shaft and carrying a pendulum weight, said last named arm extending vertically downward when said pointer is at zero on said scale, and a housing for said unitary structure, whereby said parts of said unitary structure may be first assembled and then placed in said housing, and all of the parts associated with said shaft except said pendulum weight are substantially in balance about said shaft.

MORRIS W. CREW.